(12) United States Patent
Takemura et al.

(10) Patent No.: US 9,618,180 B2
(45) Date of Patent: Apr. 11, 2017

(54) RESIN SHEET PRODUCING METHOD, OPTICAL MEMBER PRODUCED BY RESIN SHEET PRODUCING METHOD, AREA LIGHT SOURCE DEVICE IN WHICH OPTICAL MEMBER IS USED, LIQUID CRYSTAL DISPLAY DEVICE, AND MOBILE DEVICE

(71) Applicant: OMRON Corporation, Kyoto (JP)

(72) Inventors: Koichi Takemura, Shiga (JP); Gouo Kurata, Saitama (JP); Yoshihisa Yamanaka, Shiga (JP); Masayuki Kojima, Shiga (JP); Morihisa Ota, Shiga (JP)

(73) Assignee: OMRON Corporation, Kyoto (JP)

( * ) Notice: Subject to any disclaimer, the term of this patent is extended or adjusted under 35 U.S.C. 154(b) by 309 days.

(21) Appl. No.: 13/763,123

(22) Filed: Feb. 8, 2013

(65) Prior Publication Data

US 2014/0125921 A1 May 8, 2014

(30) Foreign Application Priority Data

Nov. 5, 2012 (JP) .................................. 2012-243983

(51) Int. Cl.
| | |
|---|---|
| *F21V 5/02* | (2006.01) |
| *B26D 11/00* | (2006.01) |
| *B26D 7/27* | (2006.01) |
| *F21V 8/00* | (2006.01) |

(52) U.S. Cl.
CPC ................. *F21V 5/02* (2013.01); *B26D 7/27* (2013.01); *B26D 11/00* (2013.01); *G02B 6/0065* (2013.01); *B26F 2210/08* (2013.01); *G02B 6/0036* (2013.01); *G02B 6/0053* (2013.01); *Y10T 83/04* (2015.04); *Y10T 83/0476* (2015.04); *Y10T 428/24777* (2015.01)

(58) Field of Classification Search
CPC .. B26D 3/00; B26D 7/27; B29C 37/02; B29C 43/38; B29C 51/266; B29C 51/268; B29C 45/02
USPC .................................................. 264/160–162
See application file for complete search history.

(56) References Cited

U.S. PATENT DOCUMENTS

| | | | |
|---|---|---|---|
| 4,342,105 A | * | 7/1982 | Dorfman .......................... 368/88 |
| 8,123,445 B2 | | 2/2012 | Yamamoto et al. |

FOREIGN PATENT DOCUMENTS

| | | | |
|---|---|---|---|
| JP | 08006014 A | * | 1/1996 |
| JP | 11-232918 A | | 8/1999 |
| JP | 2004-148419 A | | 5/2004 |
| JP | 2007223021 A | | 9/2007 |
| JP | 2009-140743 A | | 6/2009 |

OTHER PUBLICATIONS

Machine translation of JP2007-223021 acquired Jan. 9, 2015.*

(Continued)

*Primary Examiner* — Gerard Higgins
(74) *Attorney, Agent, or Firm* — Osha Liang LLP (57) ABSTRACT

An area light source device has a transfer-molded optical member, and a light source disposed in a position facing at least one of end faces of the optical member. Light incident to the optical member from the light source is output through a light exit surface of the optical member. A cutting back clearance portion is provided in at least one of corner portions of the end face of the optical member.

5 Claims, 10 Drawing Sheets

(56) References Cited

OTHER PUBLICATIONS

Machine translation of JP 08-006014 acquired on Jun. 10, 2015.*
Office Action for Japanese Application No. 2012-243983 dated Jan. 29, 2013, with English translation thereof (4 pages).

* cited by examiner

MEASUREMENT POSITION

RESIN SHEET PRODUCING METHOD, OPTICAL MEMBER PRODUCED BY RESIN SHEET PRODUCING METHOD, AREA LIGHT SOURCE DEVICE IN WHICH OPTICAL MEMBER IS USED, LIQUID CRYSTAL DISPLAY DEVICE, AND MOBILE DEVICE

CROSS-REFERENCE TO RELATED APPLICATION

The present application claims priority from Japanese Patent Application No. 2012-243983, filed on Nov. 5, 2012, the subject matter of which is hereby incorporated by reference.

BACKGROUND

Technical Field

The present invention relates to a method for producing a resin sheet used in screens of mobile devices, such as a mobile phone and a smartphone, an optical member that is produced by the resin sheet producing method, an area light source device in which the optical member is used, a liquid crystal display device, and the mobile device.

Related Art

For example, Japanese Unexamined Patent Publication No. 2007-223021 discloses cutting work, in which a cutting member is moved along a lengthwise direction of a sheet-like member while rotated and the cutting member is brought into contact with an end face of the sheet-like member to perform the cutting.

However, in the cutting work disclosed in Japanese Unexamined Patent Publication No. 2007-223021, because the end face is cut while a cutting edge is rotated, a chip is not completely removed from a corner of the end face when the end face is cut, and a burr is left.

SUMMARY

One or more embodiments of the present invention provides a resin sheet producing method in which the generation of the burr is prevented, an optical member that is produced by the resin sheet producing method, an area light source device in which the optical member is used, a liquid crystal display device, and a mobile device. A light guide plate and a prism sheet can be cited as an example of the optical member.

In accordance with one or more embodiments of the present invention, a resin sheet producing method for cutting an end face of a transfer-molded resin sheet with a cutting part, wherein the end face is cut with the cutting part that moves toward a cutting back clearance portion provided in a corner portion of the end face.

Because the cutting back clearance portion is provided in the corner portion of the end face, the cutting part cuts the cutting back clearance portion when cutting the end face, which allows the generation of the burr to be prevented.

In the resin sheet producing method, the cutting back clearance portion may be a tapered surface, or the cutting back clearance portion may be a curved surface.

Because the cutting back clearance portion may be the tapered surface or the curved surface, a degree of freedom is enhanced in designing the resin sheet.

In the resin sheet producing method, the cutting part may rotate a cutting edge provided in an outer peripheral surface.

Only the cutting edge is rotated, so that the end face of the resin sheet can be cut by the simple configuration.

In the resin sheet producing method, a rotating axis of the cutting part may be disposed in parallel with the end face of the resin sheet.

Therefore, the end face of the resin sheet can easily be cut only in such a manner that the end face of the resin sheet is translated while abutted on the rotating axis.

In the resin sheet producing method, a mirror finish part that performs mirror finish to the end face of the resin sheet cut with the cutting part may include a turn axis that is orthogonal to the end face of the resin sheet and a mirror finish edge that is provided in a side surface facing the end face.

In the above configuration, the mirror finish edge is rotated to perform mirror finish to the end face only in such a manner that the end face of the resin sheet is pressed against the mirror finish edge.

In the resin sheet producing method, a dummy sheet may be provided in at least one surface of the stacked resin sheets, and the mirror finish edge may perform cutting toward the dummy sheet.

When the mirror finish edge performs the cutting toward the dummy sheet provided in one surface of the resin sheets, the burr is generated in the dummy sheet, which allows the generation of the burr to be prevented in the resin sheet.

In accordance with one or more embodiments of the present invention, an optical member is produced by the producing method in accordance with the first aspect.

In accordance with one or more embodiments of the present invention, an area light source device includes a transfer-molded optical member, wherein a light source is disposed in a position facing at least one of end faces of the optical member, light incident to the optical member from the light source is output through a light exit surface of the optical member, and a cutting back clearance portion is provided in at least one of corner portions of the end face of the optical member.

Because the cutting back clearance portion is provided in the corner portion of the end face, the cutting part cuts the cutting back clearance portion when cutting the end face. Therefore, the area light source device in which the burr is not generated can be obtained.

In the area light source device the cutting back clearance portion of the optical member may be provided at an angle at which the cutting back clearance portion has no influence on optical performance of the light output through the light exit surface. As used herein, for example, the optical performance of the light means evenness of luminance.

Therefore, the light can be prevented from being reflected in an unintentional direction, and the desired optical performance is obtained.

In the area light source device, at least the cutting back clearance portion that is provided in the end face in which the light source is disposed may be provided at an angle at which the cutting back clearance portion has no influence on a directivity of the light emitted from the light source.

Therefore, the light can be prevented from being reflected in an unintentional direction, and the desired optical performance is obtained.

In accordance with one or more embodiments of the present invention, a liquid crystal display device includes: the area light source device in accordance with one or more embodiments of the present invention; and a liquid crystal panel that transmits the light emitted from the area light source device.

In accordance with one or more embodiments of the present invention, a mobile device includes the area light source device in accordance with one or more embodiments of the present invention.

BRIEF DESCRIPTION OF THE DRAWINGS

FIGS. 8A-8F are views illustrating a flow rate of the molten resin in one or more embodiments of the present invention.

DETAILED DESCRIPTION

Hereinafter, embodiments of the present invention will be described with reference to the accompanying drawings. In the following description, a term indicating a specific direction or position (for example, a term including "upper", "lower", "side", and "end") is used. The term is used in the drawings only for the purpose of easy understanding of the present invention, but the technical scope of the present invention is not limited to the term. The following description is made only by way of example, but the present invention and application of the present invention are not limited to the following description. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

(Configuration)

Figure 1:
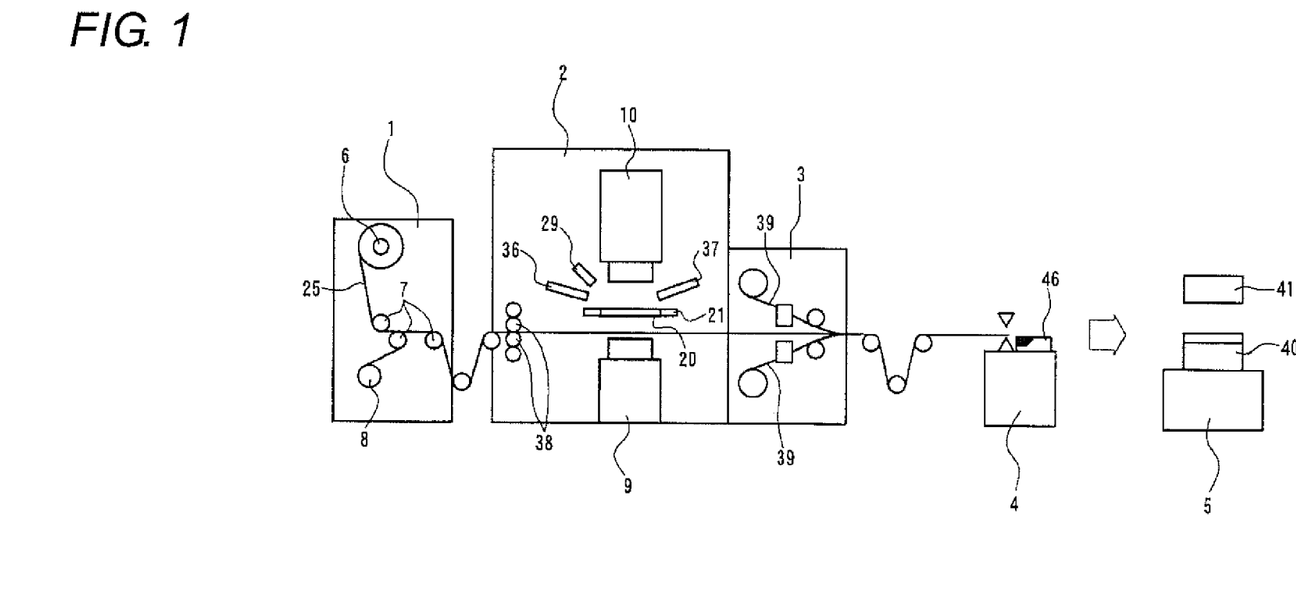
FIG. 1 is a schematic diagram illustrating an optical member forming apparatus according to one or more embodiments of the present invention.

FIG. 1 illustrates a schematic optical member forming apparatus according to one or more embodiments of the present invention. The optical member forming apparatus includes a material supply apparatus 1, a transfer molding apparatus 2, a film adhesion apparatus 3, a cutting apparatus 4, and an outer shape machining apparatus 5.

The material supply apparatus 1 rewinds a resin sheet 25 wound around a main roller 6, and supplies the resin sheet 25 to the transfer molding apparatus 2. Plural rollers 7 are disposed in the material supply apparatus 1, a protective sheet adhering to the resin sheet 25 is peeled off immediately after the second roller 7, and the protective sheet is wound by a winding roller 8. At this point, the resin sheet 25 is made of polycarbonate (melting points of 220 to 230° C., and a glass-transition temperature of about 150° C.).

Figure 2:
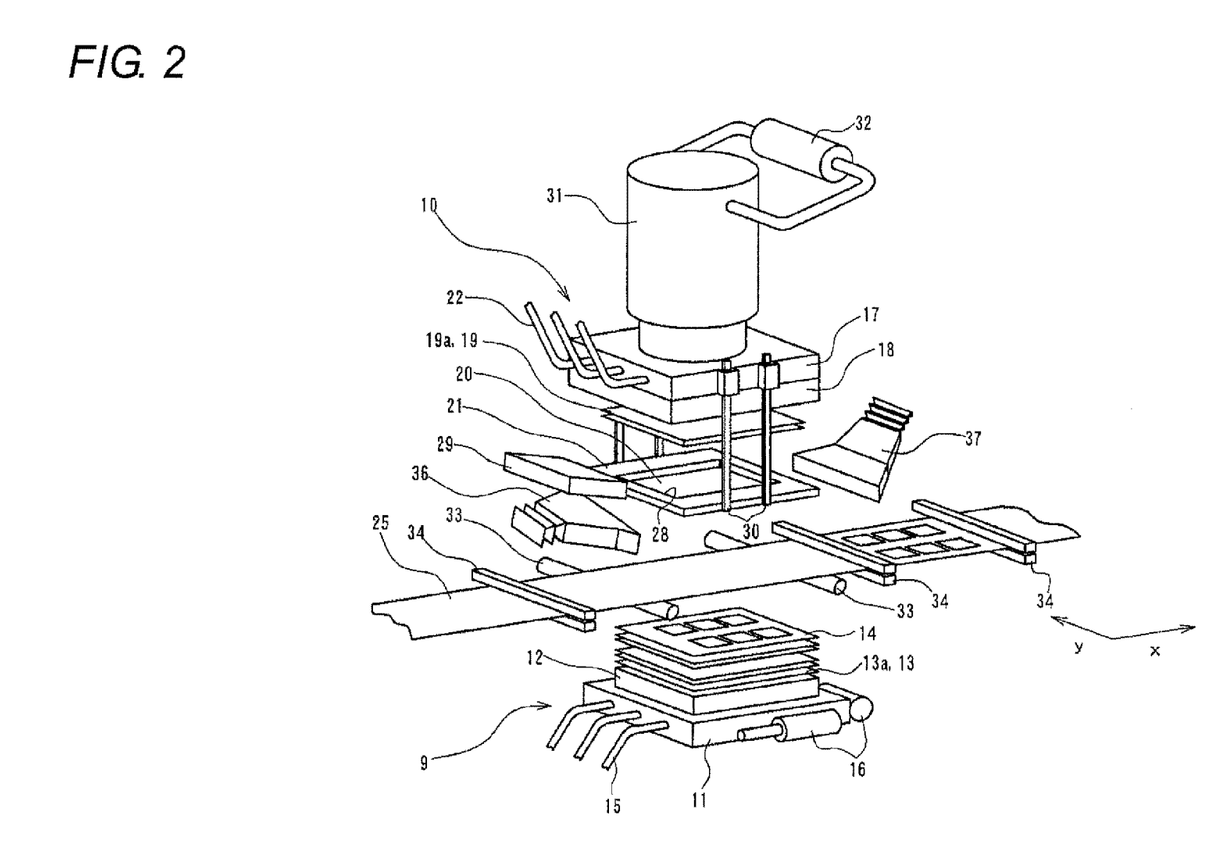
FIG. 2 is a partially exploded perspective view schematically illustrating a transfer molding apparatus in FIG. 1.

As illustrated in FIG. 2, the transfer molding apparatus 2 includes a lower die 9 and an upper die 10.

In the lower die 9, a lower-die intermediate plate 12, a lower-die heat-insulating plate 13, and a lower-die transfer plate 14 are sequentially disposed on an upper surface of a lower-die support plate 11.

The lower-die support plate 11 made of stainless steel (SUS) is formed into a rectangular plate shape when viewed from above. Plural through-holes are made between side surfaces of the lower-die support plate 11, and heaters 15 and thermocouples (not illustrated) are inserted in the through-holes. The lower-die support plate 11 is heated by energizing the heaters 15, and a temperature at the lower-die transfer plate 14 can be raised through the lower-die intermediate plate 12 and the lower-die heat-insulating plate 13. At this point, the temperature at the lower-die support plate 11, which is heated by energizing the heaters 15, is suppressed to about 180° C.

Like the lower-die support plate 11, the lower-die intermediate plate 12 made of stainless steel (SUS) is formed into the rectangular plate shape when viewed from above.

The lower-die heat-insulating plate 13 is constructed by stacking plural heat-insulating sheets 13a made of resin materials, such as polyimide (in FIG. 2, the lower-die heat-insulating plate 13 is illustrated while vertically taken down). Heat-insulating performance of heat-insulating sheets can be adjusted according to the number of stacked heat-insulating sheets 13a. At this point, the lower-die heat-insulating plate 13 is constructed by the five heat-insulating sheets, whereby the lower-die transfer plate 14 is adjusted to the temperature of about 150° C. while the lower-die support plate 11 is heated at the temperature of about 180° C. This prevents a deformation of the resin sheet 25, which is caused by a thermal influence of the lower-die support plate 11. Accordingly, a conveying line for the resin sheet 25 is disposed near the lower die 9, but it is not necessary to increase a distance in opening the dies, which allows downsizing of the transfer molding apparatus 2. In closing the dies to heat the resin sheet 25, the lower-die heat-insulating plate 13 plays a role in preventing a heat loss from the upper die 10 onto the lower die side. In cooling the resin sheet 25, the lower-die heat-insulating plate 13 plays a role in preventing the lower-die support plate 11 from being cooled.

The lower-die transfer plate 14 made of a nickel chrome alloy is formed into the rectangular plate shape when viewed from above. A transfer surface is formed on an upper surface of the lower-die transfer plate 14. In the transfer surface, plural hemispherical small projecting portions having sub-micrometer-scale depths are disposed at arbitrary intervals in an x-axis direction and a y-axis direction. Therefore, the plural hemispherical small recessed portions can be formed on a lower surface of the resin sheet 25 that is of a transfer destination. A surface in which the small recessed portions are formed constitutes a reflecting surface. The surface functions to reflect light emitted from a light source onto the upper surface side and to output the light. The small projecting portion is not limited to the hemispherical shape, but various shapes, such as a triangle in section, may be used as the small projecting portion. Not the small projecting portion, but a small recessed portion may be formed.

A horizontal surface of the lower die 9 can be moved in the x-axis direction and the y-axis direction by driving parts (not illustrated), such as a servo motor. A movement amount of the lower die 9 is detected by a micrometer 16, and a position in the horizontal surface of the lower die 9 can finely be adjusted in the x-axis direction and the y-axis direction based on the detection result. The fine adjustment of the position in the horizontal surface of the lower die 9 may manually be performed using the micrometer 16.

In the upper die 10, an upper-die intermediate plate 18, an upper-die heat-insulating plate 19, and a retention plate 21 that retains an upper-die transfer plate 20 are sequentially disposed on a lower surface of an upper-die support plate 17.

Like the lower-die support plate 11, the upper-die support plate 17 made of stainless steel (SUS) is formed into the rectangular plate shape when viewed from above. Plural through-holes are made between the side surfaces of the upper-die support plate 17, and heaters 22 and thermocouples (not illustrated) are inserted in the through-holes. The upper-die support plate 17 can be raised up to the temperature of about 280° C. by energizing the heaters 22.

Like the upper-die support plate 17, the upper-die intermediate plate 18 made of stainless steel (SUS) is formed into the rectangular plate shape when viewed from above.

Like the lower-die heat-insulating plate 13, the upper-die heat-insulating plate 19 is constructed by stacking plural heat-insulating sheets 19a made of resin materials, such as polyimide. At this point, the upper-die heat-insulating plate 19 is constructed by the two heat-insulating sheets, whereby the upper-die transfer plate 20 is adjusted to the temperature of about 240° C. Therefore, the resin sheet 25 can sufficiently be melted when the resin sheet 25 is sandwiched between the upper die 10 and the lower die 9.

Figure 3A:
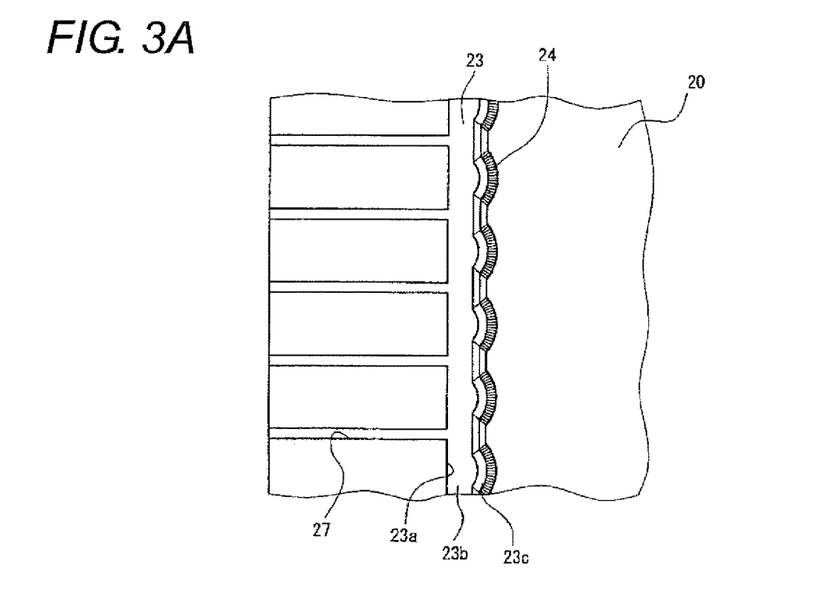
FIG. 3A is a partial bottom view of an upper-die transfer plate in FIG. 2.
Figure 3B:
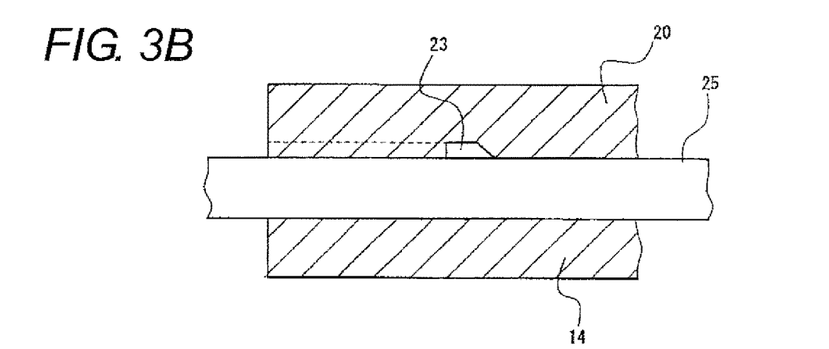
FIG. 3B is a partially schematic sectional view of a die portion in FIG. 2.
Figure 3C:
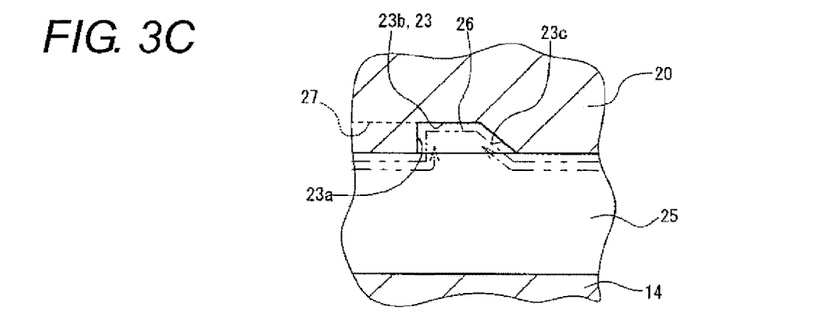
FIG. 3C is a partially enlarged sectional view of the die portion in FIG. 2.

Like the lower-die transfer plate 14, the upper-die transfer plate 20 made of a nickel chrome alloy is formed into the rectangular plate shape when viewed from above. As illustrated in FIG. 3, a recess 23 extended in a width direction is formed in the lower surface of the upper-die transfer plate 20. The recess 23 is a space surrounded by a perpendicular surface 23a, a bottom surface 23b, an inclined surface 23c, and both end faces (not illustrated). Plural arc regions 24 are arrayed in the width direction in the inclined surface 23c, and many projected thread portions each of which has a substantially triangular shape in section are radially extended in a lower half of each arc region 24.

The recess 23 is configured such that the molten resin sheet 25 flows partially into the recess 23 to form a thick portion 26 (FIG. 3). The resin sheet 25 includes an extremely thin film, films having thicknesses of 0.2 to 0.3 mm used in one or more embodiments of the present invention, and films having thickness greater than the thicknesses of 0.2 to 0.3 mm. The thick portion 26 has a height of a sub-millimeter scale. In one or more embodiments of the present invention, the thick portion 26 has the height of 0.5 mm. The projected thread portion formed in the inclined surface has a projection (surface roughness) of a sub-micrometer scale. In one or more embodiments of the present invention, the projected thread portion has the projection of 0.2 µm. A region where the projected thread portions are formed is also included in the transfer surface, and the region suppresses the leakage of the light from the inclined surface 23c by folding the light incident from the plural light sources disposed on the end face side of the thick portion 26.

Plural groove portions 27 connecting the recess 23 to the outside are formed in the lower surface of the upper-die transfer plate 20. Although, in one or more embodiments of the present invention, each groove portion 27 is formed in the direction (the x-axis direction) orthogonal to the width direction (y-axis direction) in which the recess 23 is extended, each groove portion 27 may be formed so as to intersect the width direction. Therefore, the groove portion 27 can be shortened to the minimum. Each groove portion 27 is formed so as to be located between the arc regions 24 and 24. This is attributed to the following facts.

Figure 8A:
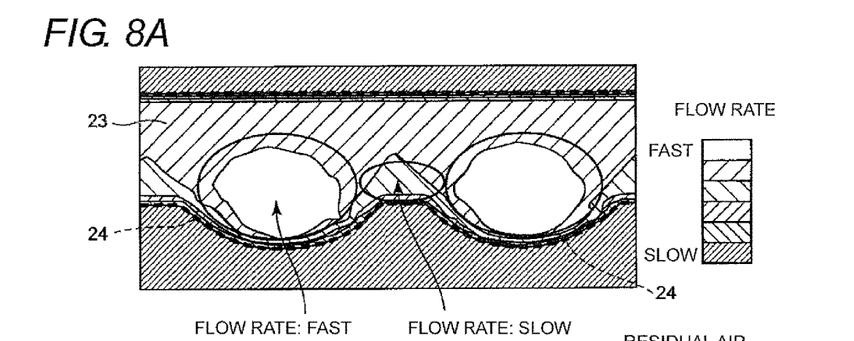
FIG. 8A is a partially enlarged view of the flow rate of the molten resin.
Figure 8B:
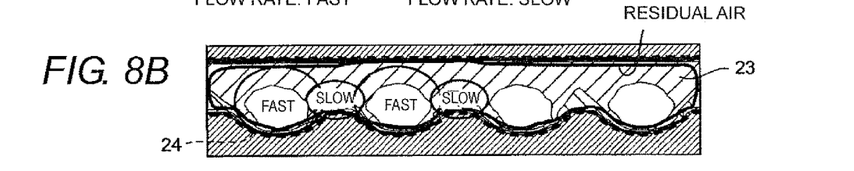
FIGS. 8B, 8C, 8D, 8E, and 8F are schematic diagrams illustrating deformation and split processes of a long and thin residual air.
Figure 8C:
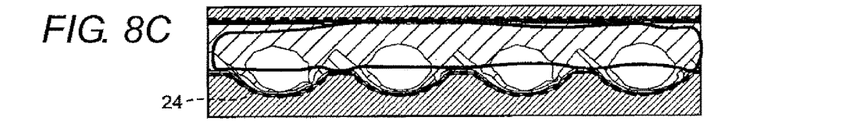
Figure 8D:
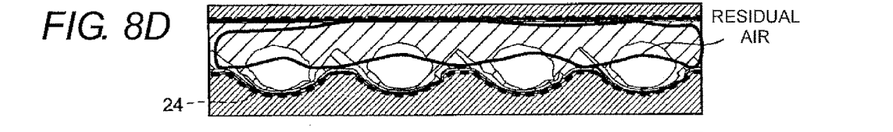
Figure 8E:
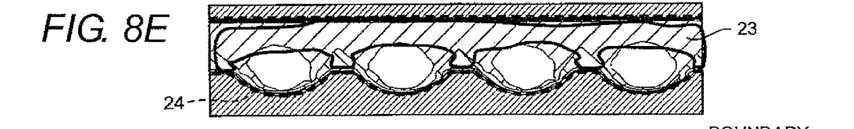
Figure 8F:
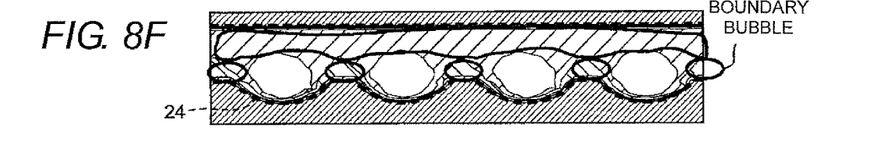

As described above, in the upper-die transfer plate 20 of one or more embodiments of the present invention, the plural arc regions 24 are arrayed in an inner edge portion of the recess 23 as illustrated in FIG. 3. Therefore, a flow rate of the molten resin flowing into the recess 23 is uneven when the resin sheet is melted to perform the transfer molding. More specifically, as illustrated in FIG. 8a, in the inner edge portion of the recess 23, the flow rate of the molten resin is fast in the arc region 24, and the flow rate of the molten resin is slow in the region located between the arc regions 24 and 24 adjacent to each other. A residual air remaining in the recess 23 of the upper-die transfer plate 20 has a substantially even width at pressurization initial and intermediate stages (FIGS. 8B and 8C). However, during the pressurization, a difference in irregularity of the residual air is increased in the inner edge portion due to the uneven flow rate of the molten resin (FIGS. 8D and 8E). In the region located between the arc regions 24 and 24 adjacent to each other, part of the residual air is separated to become a boundary bubble, and the boundary bubble remains without change. In order to equalize the flow rate of the molten resin, the groove portion 27 is provided behind the region where the molten resin has the slow flow rate. As a result, the residual air can rapidly be exhausted without generating the boundary bubble in the recess 23.

The groove portion 27 may have a depth greater than or equal to that of the recess 23. In one or more embodiments of the present invention, the depth of each groove portion 27 is identical to that of the recess 23. The width of the groove portion 27 is set to a value such that the bubble does not remain in the recess 23 while an outflow amount of molten-state resin (resin sheet 25) flowing into the recess 23 is suppressed to the minimum.

Thus, when the molten resin flows into the recess 23, the air in the recess 23 can smoothly be guided to the outside by forming the groove portion 27 connecting the recess 23 to the outside behind the region located between the arc regions 24 and 24. The molten resin flowing into the recess 23 also flows to the groove portion 27. Because the groove portion 27 has the depth greater than or equal to that of the recess 23, the air does not remain in the region from the recess 23 to the groove portion 27 (when the groove portion 27 is less than the recess 23 in the depth, a corner portion is formed, and the air possibly remains in the corner portion). Accordingly, the air does not remain in the recess 23 and a void is not generated in the thick portion 26. Because an insignificant amount of air remains in the recess 23 even if the air remains, a burn is not generated in the molded resin, the air can be melted in the molten resin by the applied pressure force without generating the void.

Figure 6A:
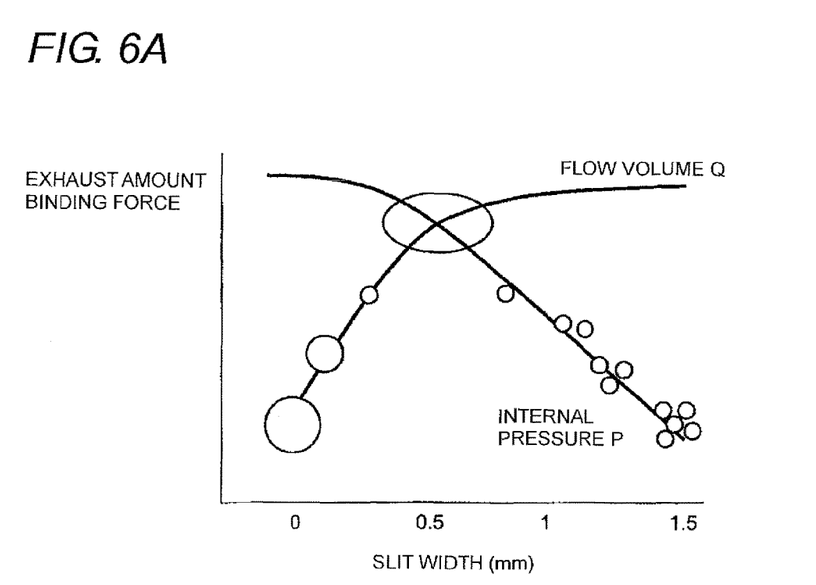
FIGS. 6A and 6B are a graph and an evaluation table illustrating an analysis result, which is performed to obtain an optimum slit width dimension removing a residual bubble.
Figure 6B:
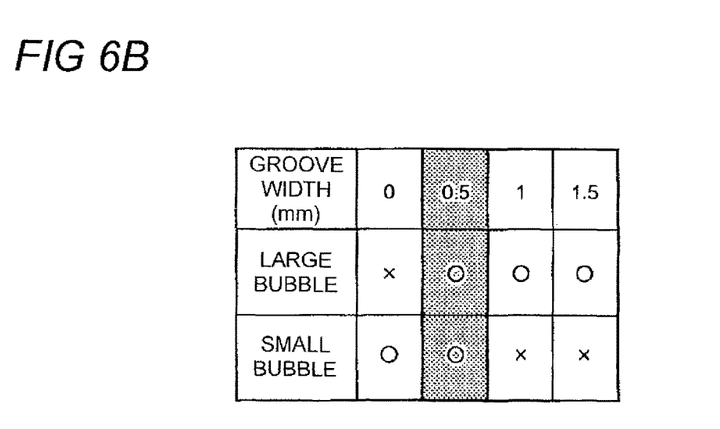

According to knowledge of the inventor, the larger bubble is easily generated and remains when the groove portion is narrowed, and the many small bubbles are easily generated and remains when the groove portion is widened. Therefore, the width of the groove portion that can efficiently exhaust and remove both the large bubble and the small bubble was measured. FIG. 6 illustrates a measurement result.

As is clear from FIG. 6, it is found that both the large bubble and the small bubble can efficiently be exhausted and removed when the width of the groove portion is set to 0.5 mm.

Figure 7A:
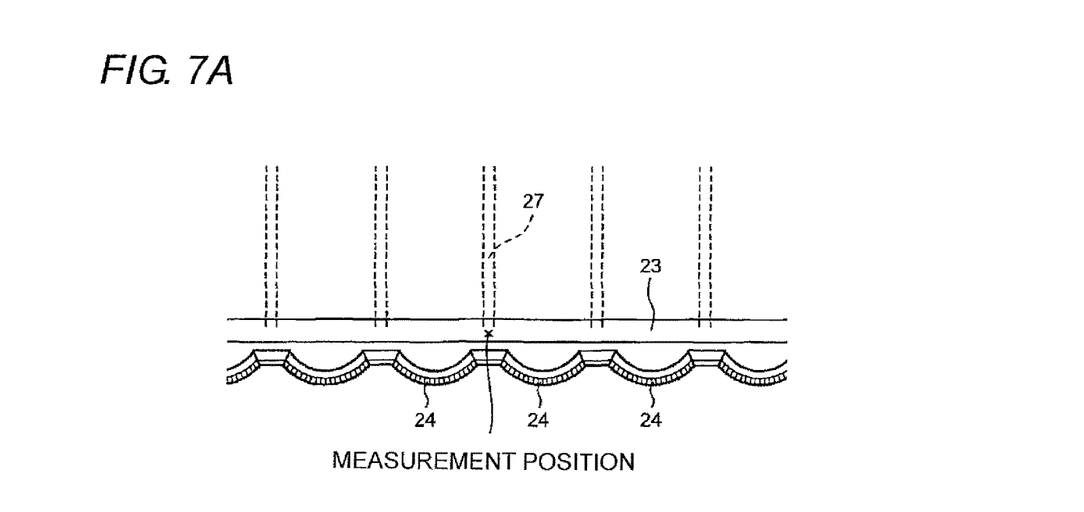
FIGS. 7A and 7B illustrate a measurement position and a graph of a measurement result when a flow rate of a molten resin changed depending on existence or non-existence of a slit is measured.
Figure 7B:
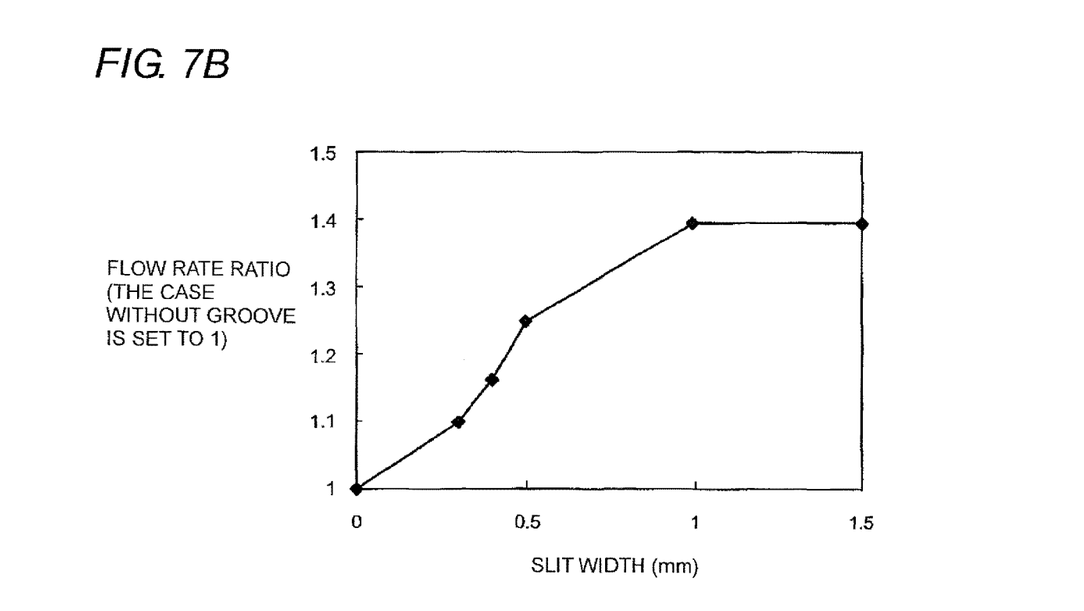

A flow rate ratio of the molten resin, which changes according to the width of the groove portion 27, was analyzed. FIGS. 7A and 7B illustrate an analysis result.

As illustrated in FIGS. 7A and 7B, in the case that the flow rate ratio of the molten resin is set to 1 for the groove portion 27 having the width of zero, the flow rate ratio exceeds 1.2 when the groove portion 27 has the width of 0.5 mm, and the flow rate ratio is increased to 1.4 when the groove portion 27 has the width of 1.0 mm. Therefore, it is found that a difference in flow rate between the molten resin in the arc region 24 and the molten resin in the region located between the arc regions 24 and 24 adjacent to each other is decreased with increasing width.

Figure 4A:
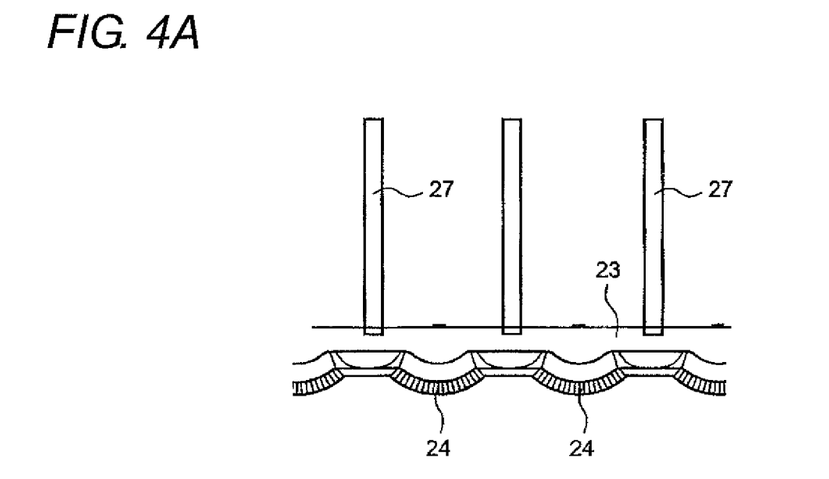
FIGS. 4A and 4B are partial plan views illustrating first and second modifications of one or more embodiments of the present invention.
Figure 4B:
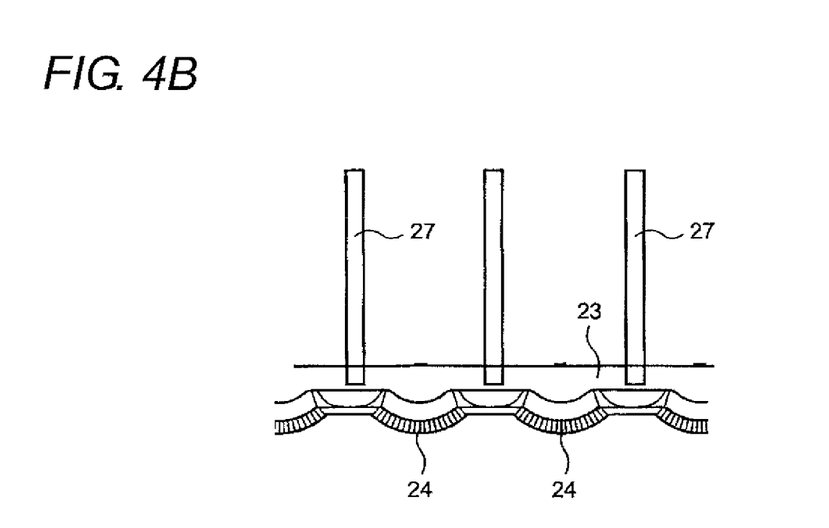
Figure 5A:
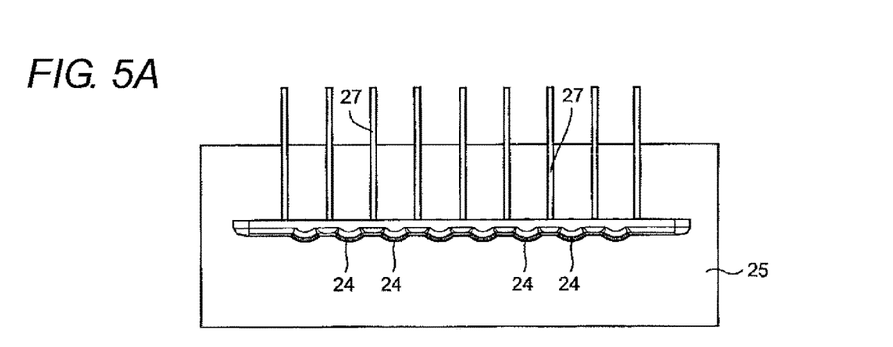
FIGS. 5A, 5B, 5C, and 5D are partial plan views illustrating third, fourth, fifth, and sixth modifications of one or more embodiments of the present invention.
Figure 5B:
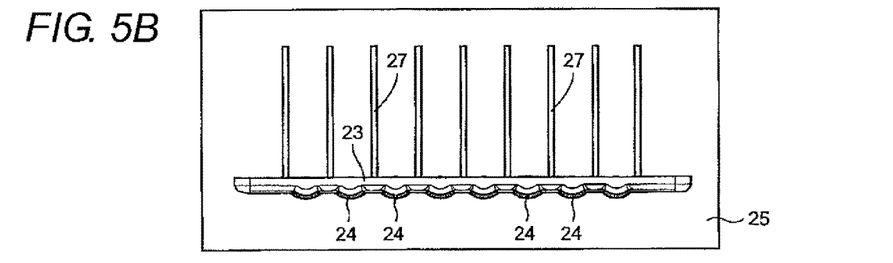
Figure 5C:
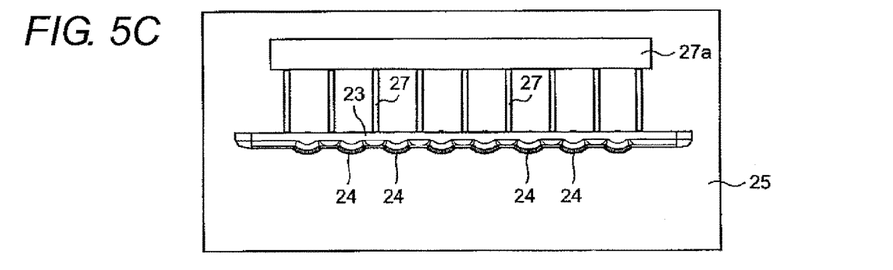
Figure 5D:
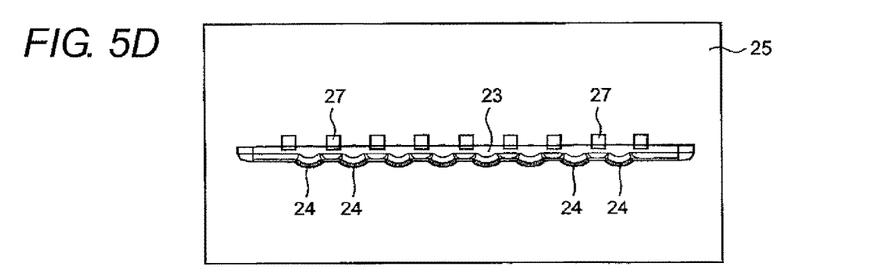

As illustrated in FIGS. 4A and 4B, the groove portion 27 may be extended so as to stretch into the recess 23 that is used to form the thick portion. As illustrated in FIG. 5, a leading end of the groove portion 27 may be extended to the outside of the resin sheet 25 (FIG. 5A), and the leading end the groove portion 27 may be disposed in the resin sheet 25 (FIG. 5B). An accumulating groove portion 27a (FIG. 5C) in which the bubble is accumulated may be provided at the leading end of the groove portion 27. The groove portion 27 is not necessarily formed into the groove shape, but the groove portion 27 may be formed into a wide recessed portion as illustrated in FIG. 5D.

The groove portions 27 are not necessarily disposed at equal intervals, but the groove portions 27 may properly be disposed at different intervals. The groove portions 27 do not necessarily have the same width and the same depth, but the groove portions 27 may have a folding-fan-shaped width and depth. A sectional area of a flow path of the groove portion 27 may homogeneously increased or decreased, or the sectional area may repeatedly be increased and decreased. The groove portion 27 is not necessarily formed into a straight shape, but the groove portion 27 may be curved or meander. The groove portion 27 is not necessarily parallel to the adjacent groove portion 27, and the groove portions 27 are not necessarily equal to each other in a length. Particularly, even if the molded product is used as a light guide plate, the extended direction of the groove portion 27 is not necessarily parallel to the light incident direction. The groove portion may be formed so as to be directly connected to the recess, or the groove portion may be formed away from the recess so as to be connected to the recess with at least another groove portion interposed therebetween.

In the groove portion 27, the above shapes may be combined as needed basis.

As illustrated in FIG. 2, the retention plate 21 made of stainless steel (SUS) is formed into the rectangular frame shape, and an opening 28 is formed in the center of the retention plate 21. The upper-die transfer plate 20 is retained in the lower surface of the retention plate 21, and exposed upward from the opening 28. The upper surface of the upper-die transfer plate 20, which is exposed from the opening 28, is irradiated with a soft X-ray using a soft X-ray irradiation apparatus 29. Therefore, electricity of the resin sheet 25 is removed, and surrounding dust is prevented from adhering to the resin sheet 25 due to an electrostatic attraction force. Rods 30 are coupled to both side portions of the retention plate 21, and the retention plate 21 can be lifted and lowered independently of the whole upper die 10 using driving parts, such as a cylinder (not illustrated).

The whole upper die 10 is lifted and lowered by a press machine 31 disposed on the upper surface side of the upper-die support plate 17. The air is supplied to and exhausted from the press machine 31 by an air supply apparatus 32, and the rod 30 is lifted and lowered to lift and lower the whole upper die 10 with the upper-die support plate 17 interposed therebetween.

The resin sheet 25 supplied by the material supply apparatus 1 is conveyed between the upper die 10 and the lower die 9. On an entrance side and an exit side of the die in the middle of the conveying route of the resin sheet 25, a support roller 33 that supports the lower surface of the resin sheet 25 and a positioning gripper 34 that vertically nips the resin sheet 25 are disposed in the order located closer to the die while being able to be lifted and lowered. A conveying gripper 35 is disposed on a downstream side of the conveying route. Like the positioning gripper 34, the conveying gripper 35 vertically nips the resin sheet 25, and reciprocally moves along the conveying route by a driving part (not illustrated). In the state in which the positioning gripper 34 is opened, the conveying gripper 35 moves onto the downstream side of the conveying route while nipping the resin sheet 25, which allows the resin sheet 25 to be conveyed. Behaviors of the support roller 33 and the grippers are described later.

An air supply duct 36 is disposed on the upper side on the upstream side of the die, and an exhaust air duct 37 is disposed on the upper side on the downstream side of the die. The air supplied by a compressor (not illustrated) blows from the air supply duct 36, and the air blows on the resin sheet 25 located between the upper die 10 and the lower die 9 from obliquely above. The air is sucked from the exhaust air duct 37 by the compressor (not illustrated), and the air blowing on the resin sheet 25 is collected from the air supply duct 36. The air supplied from the air supply duct 36 is purified, an air flow formed from the air supply duct 36 to the exhaust air duct 37 not only cools the resin sheet 25, but also forms what is called an air barrier to prevent the dust from adhering to the surface of the resin sheet 25. Because the electricity of the resin sheet 25 is removed by the irradiation of the soft X-ray, the dust does not adhere to the resin sheet 25 due to the electrostatic attraction force.

As illustrated in FIG. 1, adhesive rollers 38 that come into contact with the upper and lower surfaces of the resin sheet 25 are disposed on the upstream side of the die. When the adhesive rollers 38 are rotated, the adhesive rollers 38 remove the dust adhering to the surface of the resin sheet 25 while conveying the resin sheet 25.

The film adhesion apparatus 3 causes protective films 39 to adhere to the upper and lower surfaces of the resin sheet 25 after the transfer molding. The protective film 39 prevents the resin sheet 25 from being damaged due to a collision with another member, or prevents the dust from adhering to the surface of the resin sheet 25.

The cutting apparatus 4 obtains a half-finished plate 46 by cutting and/or punching the resin sheet 25 to which the transfer molding is performed. In the half-finished plate 46, cutting margins are left in the thick portion 26 and the end face on the opposite side of the thick portion 26.

A cutter is provided on the upstream side, for example, in the material supply apparatus 1, and the resin sheet 25 may be cut along the conveying direction in each of the half-finished plates that are previously arrayed in the width direction.

The outer shape machining apparatus 5 includes a jig 40 that positions the plural half-finished plates 46 while the plural half-finished plates 46 are stacked and a cutting member 41 that grinds, cuts, and polishes the end face of the half-finished plate, namely, the outside surface of the thick portion 26 that is positioned by the jig 40.

The plural half-finished plates 46 are stacked in the jig 40, and the jig 40 is disposed while the upper and lower surfaces of the jig 40 are nipped by dummy plates 47. The dummy plates 47 and the half-finished plates 46, which are disposed while stacked, are retained in the jig 40 using a clamp member (not illustrated).

Figure 9A:
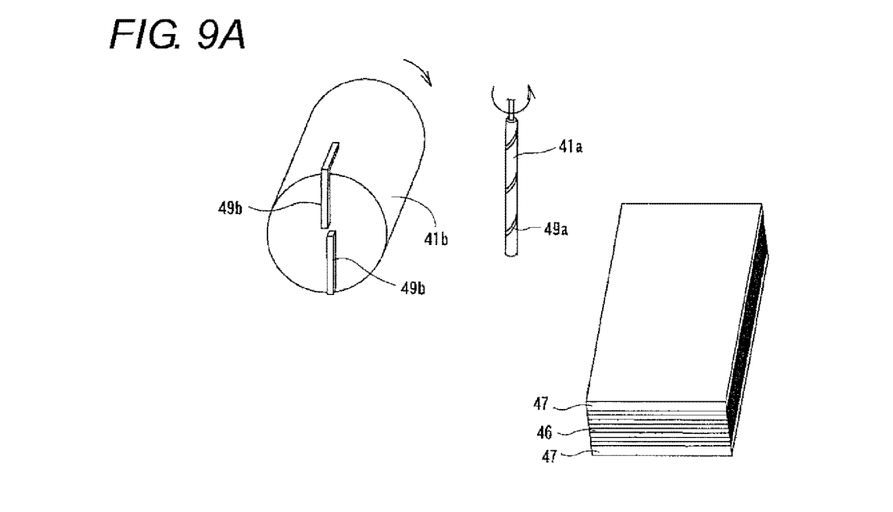
FIG. 9A is an explanatory view illustrating a positional relationship between a half-finished plate and a cutting tool.
Figure 9B:
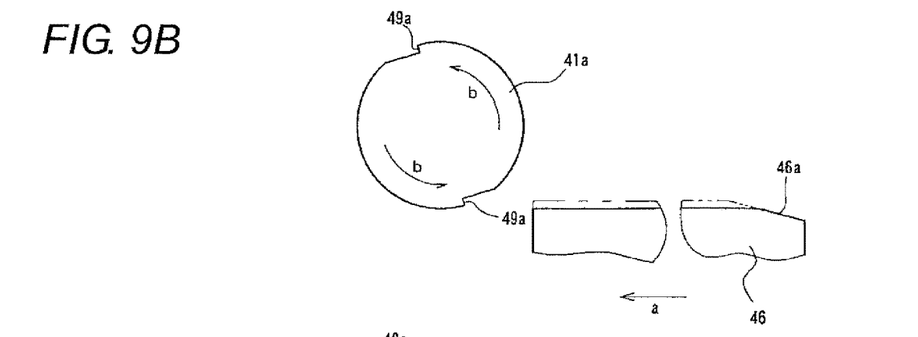
FIG. 9B is a sectional view illustrating a state in which a half-finished product is cut.
Figure 9C:
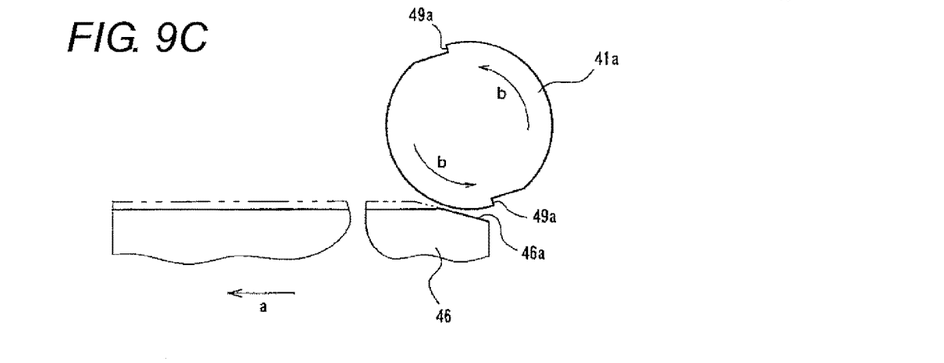
FIG. 9C is a sectional view illustrating a state immediately after the half-finished product is cut.

As illustrated in FIG. 9, the cutting member 41 includes a cutting tool (the cutting part) 41a and a cutting tool (the mirror finish part) 41b, which are rotated by driving parts. The cutting tool 41a has a drill shapes, and a cutting edge 49a is provided at a position, which is point-symmetric in relation to a rotating axis, in an outer circumferential surface of the cutting tool 41a. A rotating axis of the cutting tool 41a is disposed in parallel with the end face of the half-finished plate 46. The cutting tool 41b has a drum shape. A cutting edge (the mirror finish edge) 49b is provided at a position that is line-symmetric in relation to a rotating axis orthogonal to the rotating axis of the cutting tool 41a, and the cutting edge 49b faces the end face of the half-finished plate 46. Therefore, cutting loci of the cutting tools 41a and 41b intersect each other. A specific cutting method performed by the cutting tools 41a and 41b is described later.

(Behavior)

A behavior of the transfer molding apparatus having the above configuration will be described below.

(Preparation Process)

As illustrated in FIG. 1, the upper die 10 is lifted to open the die, and the leading end portion of the resin sheet 25 supplied from the material supply apparatus 1 is nipped by the conveying gripper 35 (FIG. 2). After the conveying gripper 35 is moved, the resin sheet 25 is nipped by the positioning grippers 34 and 34 to dispose the resin sheet 25 in a region where the upper die 10 and the lower die 9 face each other (a conveying process).

The die is previously heated by energizing the heater 15. As described above, because the heat-insulating plate is interposed, the upper-die transfer plate 20 becomes about 240° C. in the upper die 10, and the lower-die transfer plate 14 becomes about 150° C. in the lower die 9. In the lower die 9 located near the resin sheet 25, the upper surface of the lower die 9 is suppressed to around a glass-transition temperature, and the resin sheet 25 is bent downward by a thermal influence. Therefore, a trouble such that the resin sheet 25 comes into contact with the lower-die transfer plate 14 is not generated (a preheating process).

(Transfer Molding Process)

The support roller 33 and the positioning gripper 34 are lowered to place the resin sheet 25 on the lower-die transfer plate 14 of the lower die 9. The press machine 31 is driven to lower the upper die 10, and the transfer surface of the upper-die transfer plate 20 is abutted on the resin sheet 25. At this point, a pressure acting on the press machine 31 is suppressed to a low level, and the resin sheet 25 is lightly nipped between the dies. Therefore, the resin sheet 25 is heated to remove a moisture included in a surface layer (a preheating process).

The pressure applied by the press machine 31 is increased when a previously-set time elapses since the preheating process is started. As described above, the resin sheet 25 is made of polycarbonate (melting points of 220 to 230° C., and the glass-transition temperature of about 150° C.). Because the upper-die transfer plate 20 is heated to 240° C., the temperature of the resin sheet 25 exceeds the melting point, and the resin sheet 25 becomes the molten state. In the lower die 9, although the lower-die transfer plate 14 has the temperature of 180° C., the heat is not lost from the lower die side because the lower-die heat-insulating plate 13 is disposed. Therefore, the whole region of the resin sheet 25 nipped by the dies exceeds the melting point to become the molten state (a heating and pressurization process).

The pressure is applied from the upper die 10 by the press machine 31. Therefore, the resin sheet 25 is thinned in the portion nipped by the dies, and part (an upper surface portion) of the resin sheet 25 flows into the recess 23 formed in the upper-die transfer plate 20. When the molten resin flow into the recess 23, the residual air in the recess 23 is exhausted to the outside through the groove portion 27. The recess 23 is completely filled with the molten resin, and part of the molten resin flows out to the groove portion 27. The depth of the groove portion 27 is greater than or equal to the depth of the recess 23 (in this case, the same depth). Therefore, the air does not remain in the recess 23, but the air is smoothly exhausted to the outside. Troubles, such as the burn, are not generated because the residual air is not compressed in the recess 23. Even if a small amount of air remains in the recess 23, because the sufficient pressure is applied to the recess 23, the air can be melted in the molten resin without generating the void.

The upper die 10 is lifted when a previously-set time elapses since the heating and pressurization process is started. However, the upper-die transfer plate 20 remains abutted on the resin sheet 25 by driving the cylinder. At this point, the air is supplied onto the upper-die transfer plate 20 through the air supply duct 36. The heated upper-die support plate 17 is distant from the resin sheet 25, and the air blows onto the upper-die transfer plate 20 from the air supply duct 36. That is, the resin sheet 25 can be cooled only through the upper-die transfer plate 20. The heat of the upper-die support plate 17 does not affect the cooling of the resin sheet 25, so that the resin sheet 25 can effectively be cooled in a short time. That is, the resin sheet 25 can be cooled in a short time to temperatures of 150° C., which is of the glass-transition temperature of polycarbonate, or less. In this case, because the upper-die support plate 17 and the upper-die intermediate plate 18 are not cooled, an energy loss is decreased, and the next transfer molding process can smoothly be started in a short time (a cooling process).

When a previously-set time elapses since the cooling process is started, namely, when the molten resin is solidified to stabilize the shape by the cooling, the upper-die transfer plate 20 is lifted and released from the molded portion. The support roller 33 is lifted to release the molded portion from the lower-die transfer plate 14. Therefore, the thick portion 26 having the sub-millimeter-scale height, namely, the height of 0.2 mm is formed on the upper surface of the resin sheet 25. The plural projected thread portions having the sub-micrometer-scale saw-tooth shape, namely, the 14-μm saw-tooth shape are formed on the inclined surface of the thick portion 26. On the other hand, on the lower surface of the resin sheet 25, the plural spherical small recessed portions are formed at constant intervals in the x-axis direction and the y-axis direction (a releasing process).

Conventionally, although the sub-micrometer-scale projection can be formed in the resin sheet 25 by the transfer molding, the sub-millimeter-scale thick portion 26 cannot simultaneously be formed. The use of the transfer molding apparatus 2 having the die structure can simultaneously form the sub-micrometer-scale projected thread portion and the sub-millimeter-scale thick portion 26 in the resin sheet 25. Because the whole resin sheet 25 nipped between the dies is melted in the transfer molding, the internal stress does not remain in the half-finished plate 46 obtained by the solidification of the melted resin sheet 25. Accordingly, the plural LEDs are disposed on the end face side of the thick portion 26, and the whole upper surface except the thick portion 26 can evenly be irradiated with the light after the light is transmitted through the thick portion 26 without deviation.

(Film Adhesion Process)

The resin sheet 25 to which the transfer molding is performed by the transfer molding apparatus 2 is further conveyed onto the downstream side, and the film adhesion apparatus 3 causes the protective films 39 to adhere to the upper and lower surfaces of the resin sheet 25. The protective film 39 prevents the resin sheet 25 from being damaged due to the collision with another member, or prevents the generation of the trouble due to the surrounding dust adhering to the half-finished plate 46. The half-finished plate 46 becomes the light guide plate that is one of the optical members through the subsequent processing. Then the protective film 39 is peeled off from the resin sheet 25 when the liquid crystal panel is assembled.

(Cutting Process)

The resin sheet 25 in which the protective films 39 adhere to the upper and lower surfaces is further conveyed onto the downstream side, the cutting apparatus 4 cuts the resin sheet 25 in units of half-finished plates in the conveying direction to form a reed-shaped resin sheet 25. Then the resin sheet 25 is punched in each half-finished plate 46. At this point, the half-finished plate 46 has the cutting margins for an outer shape machining process in the thick portion 26 and the end face on the opposite side of the thick portion 26, and a cutting back clearance portion 46a is properly formed in a corner portion of the half-finished plate 46.

(Outer Shape Machining Process)

As illustrated in FIG. 9A, the half-finished plates 46 obtained through the cutting process are stacked such that the thick portions 26 are alternately located on the opposite sides. At this point, one end face and one side surface of the stacked half-finished plates 46 and dummy plates 47 are abutted on and positioned in two side surfaces (not illustrated) orthogonal to each other in the jig 40, and fixed.

After roughly cut using the drill-shaped cutting tool 41a of the cutting member 41, the stacked half-finished plates 46 and dummy plates 47 are polished as finish cutting using the drum-shaped cutting tool 41b.

The half-finished plates 46 and dummy plates 47, which are fixed to the jig 40, are slid to cut the end faces of the half-finished plates 46 and dummy plates 47, which are projected from the side surface of the jig 40, using the cutting tool 41a (FIG. 9B). Because the cutting edge 49a of the cutting tool 41a reaches the cutting back clearance portion 46a immediately before the cutting is ended, advantageously a burr of the cutting is not generated (FIG. 9C). Accordingly, part of the cutting back clearance portion may be left after the cutting.

The projections of the half-finished plates 46 and dummy plates 47 are greater than or equal to a minimum length (the cutting margin) in which the jig 40 and a clamp plate 45 are not cut using the cutting tools 41a and 41b, and is less than or equal to a maximum length in which the burr caused by a flutter is not generated during the cutting. The cutting back clearance portion 46a having a predetermined angle (in this case, 3° to 10°) with respect to the end face to be cut is formed in the corner portion of the cutting surface of each half-finished plate 46. The cutting back clearance portion 46a may be a tapered surface or an R-surface. In the case that the cutting back clearance portion 46a is the tapered surface, the tapered surface may have angles of 3 degrees to 10 degrees. When the angle of the tapered surface is less than 3 degrees, the tapered surface is hardly punched, and desired punching accuracy is hardly obtained. When the angle of the tapered surface is greater than 10 degrees, the light is unintentionally reflected to adversely affect the optical performance.

Then the half-finished plates 46 and dummy plates 47, which are fixed to the jig 40, are slid toward the cutting tool 41b to finish-cut the end faces of the half-finished plates 46 and dummy plates 47, which are projected from the side surface of the jig 40, from above using the cutting edge 49b of the cutting tool 41b.

In one or more embodiments of the present invention, because the loci of the cutting edges 49a and 49b of the cutting tools 41a and 41b intersect each other, advantageously the polishing can efficiently and cleanly be performed.

In the case that one end face of the stacked half-finished plates 46 and dummy plates 47 is finished using the cutting tool 41b, the burr is located in the dummy plate 47 even if the burr is formed, but the burr is not formed in the half-finished plate 46.

After one end of the stacked the half-finished plates 46 and dummy plates 47 is cut, the clamp state of the jig 40 is released, and the other end of the half-finished plates 46 and dummy plates 47 is cut in the similar manner while projected from the side surface of the jig 40. Therefore, plural light guide plates 48 are completed at one time. In one or more embodiments of the present invention, the half-finished plate 46 and the dummy plate 47 are cut using the cutting tools 41a and 41b rotation-driven. Alternatively, for example, a cutting part that reciprocally moves (slides) on line to perform the cutting may be used instead of the cutting tools 41a and 41b.

Figure 10:
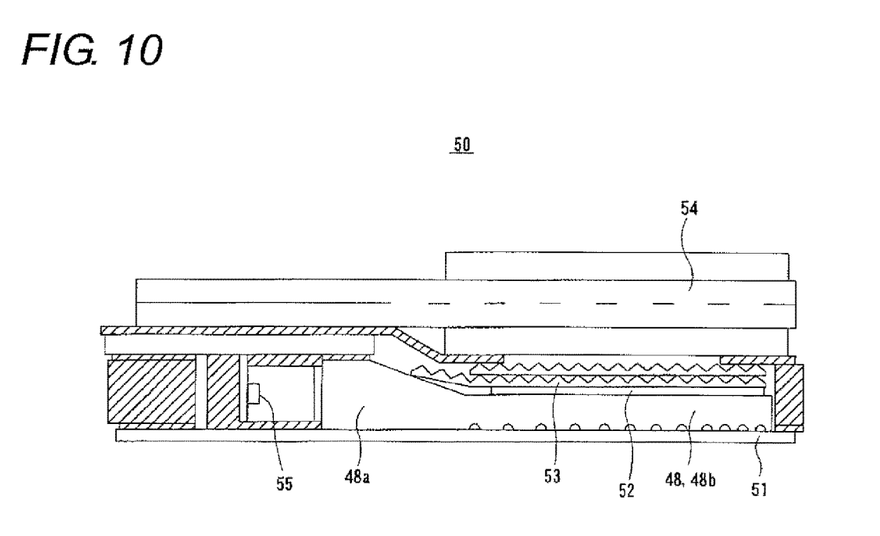
FIG. 10 is a sectional view illustrating a liquid crystal display device in which a light guide plate and a prism sheet, which are an optical member of one or more embodiments of the present invention, is incorporated.

For example, as illustrated in FIG. 10, the completed light guide plate 48 includes a thick portion 48a having the thickness of 0.5 mm and a thin portion 48b having the thickness of 0.2 mm, the thick portion 48a has a substantially trapezoidal shape in section, and the projected thread portion is provided in a lower half of the inclined surface of the thick portion 48a. Many small recessed portions are formed in the bottom surface of the light guide plate 48.

A diffuser plate 52, a prism sheet 53, and a liquid crystal panel 54 are sequentially stacked on the light guide plate 48 placed on a base 51. An LED 55 that is of the light source is disposed in a lateral portion of a perpendicular surface of the thick portion 48a to obtain a liquid crystal display device 50.

Therefore, the light emitted from the LED 55 is guided to the thin portion 48b without leaking to the outside because of the projected thread portion of the thick portion 48a, and evenly diffused by the hemispherical small recessed portion in the bottom surface, and the liquid crystal panel 54 is irradiated with the light through the diffuser plate 52 and the prism sheet 53.

The area light source device may solely be used without providing the liquid crystal panel 54.

The present invention is not limited to the above embodiments, but various changes can be made.

For example, in one or more embodiments of the present invention, the resin sheet 25 is melted and part of the molten resin is caused to flow into the recess 23 formed in the upper-die transfer plate 20, thereby forming the thick portion 26 in FIG. 3. Alternatively, the thick portion 26 may be formed as follows.

The resin sheet 25 is not melted and part of the molten resin is not caused to flow into the recess, but an additional member (for example, a resin piece) may be supplied according to the recess 23 of the upper-die transfer plate 20. Therefore, the thick portion 26 can easily be formed.

The additional member may integrally be formed by previously thickening part of the resin sheet 25. Therefore, a mechanism that supplies the additional member is eliminated to improve workability.

In one or more embodiments of the present invention, the recess is provided in the edge portion on one side of the upper-die transfer plate 20. Alternatively, the recess may be provided in a central portion of the upper-die transfer plate 20, the lower-die transfer plate 14, or both the upper-die transfer plate 20 and the lower-die transfer plate 14.

The die structure including the upper die 10 and the lower die 9 is used in one or more embodiments of the present invention. Alternatively, a die that is horizontally opened and closed may be used.

In one or more embodiments of the present invention, the transfer surfaces are formed in the upper-die transfer plate 20 and the lower-die transfer plate 14. Alternatively, the transfer surface may be formed in one of the upper-die transfer plate 20 and the lower-die transfer plate 14. The transfer plates are eliminated, and the transfer surfaces may directly be formed in the dies (for example, an intermediate plate).

In one or more embodiments of the present invention, the whole upper-die transfer plate 20 is evenly heated. However, the whole upper-die transfer plate 20 is not necessarily evenly heated. For example, the neighborhood of the recess may intensively be heated. Therefore, the good molten state of the resin can be obtained in the recess to form the good thick portion 26 in which a shrinkage is not generated.

In one or more embodiments of the present invention, the resin sheet 25 is heated and pressurized while nipped between the upper-die transfer plate 20 and the lower-die transfer plate 14, and the whole resin sheet 25 is melted. Therefore, according to one or more embodiments of the present invention, in at least one of the transfer plates 20 and 14, a flow regulating structure that regulates the flow of the molten resin is provided in a rim portion.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A resin sheet producing method comprising:
   cutting an end face of a transfer-molded resin sheet with a cutting part,
   wherein the cutting part comprises a rotating axis which is parallel with the end face of the resin sheet,
   wherein the cutting part cuts the resin sheet in a straight line along the end face and moves toward a cutting back clearance portion provided in a corner portion of the end face, and
   wherein the cutting back clearance portion has a predetermined angle with respect to the end face to be cut, and
   performing, via a mirror finish part, mirror finish to the end face of the resin sheet cut with the cutting part,
   wherein the mirror finish part includes a turn axis that is orthogonal to the end face of the resin sheet and a mirror finish edge that is provided in a side surface of the mirror finish part facing the end face.

2. The resin sheet producing method according to claim 1, wherein the cutting back clearance portion is a tapered surface.

3. The resin sheet producing method according to claim 2, further comprising:
   rotating a cutting edge provided in an outer peripheral surface of the cutting part.

4. The resin sheet producing method according to claim 1, further comprising:
   rotating a cutting edge provided in an outer peripheral surface of the cutting part.

5. The resin sheet producing method according to claim 1, further comprising:
   providing a dummy sheet in at least one surface of the stacked resin sheets, wherein the mirror finish edge performs cutting toward the dummy sheet.

* * * * *